United States Patent
Chiu et al.

(10) Patent No.: US 6,690,384 B2
(45) Date of Patent: Feb. 10, 2004

(54) SYSTEM AND METHOD FOR FULL-SCENE ANTI-ALIASING AND STEREO THREE-DIMENSIONAL DISPLAY CONTROL

(75) Inventors: Yung-Feng Chiu, Miaoli Hsien (TW); Hsi-Jou Deng, Hsinchu (TW); Ruen-Rone Lee, Hsinchu (TW)

(73) Assignee: Silicon Intergrated Systems Corp., Hsin Chu (TW)

( * ) Notice: Subject to any disclaimer, the term of this patent is extended or adjusted under 35 U.S.C. 154(b) by 149 days.

(21) Appl. No.: 10/113,616

(22) Filed: Apr. 1, 2002

(65) Prior Publication Data

US 2003/0095133 A1 May 22, 2003

(30) Foreign Application Priority Data

Nov. 20, 2001 (TW) ........................................ 90128750 A

(51) Int. Cl.[7] ................................................. G09G 5/00
(52) U.S. Cl. ........................ 345/611; 345/418; 345/419; 345/630; 382/154
(58) Field of Search ........................ 345/611; 382/299, 382/275–276, 269, 154

(56) References Cited

U.S. PATENT DOCUMENTS

| | | | | |
|---|---|---|---|---|
| 6,128,000 A | * | 10/2000 | Jouppi et al. | 345/614 |
| 2002/0130886 A1 | * | 9/2002 | Baldwin | 345/611 |
| 2002/0140706 A1 | * | 10/2002 | Peterson et al. | 345/611 |
| 2003/0043169 A1 | * | 3/2003 | Hunter | 345/611 |

OTHER PUBLICATIONS

Foley, van Dam, Feiner, Hughes; "Computer Graphics: Principles and Practice, Second Edition in C" Addison–Wesley Publishing Company; 1995; Second Edition; pp 915–916.*

* cited by examiner

*Primary Examiner*—Matthew C. Bella
*Assistant Examiner*—Alysa Brautigam
(74) *Attorney, Agent, or Firm*—Merchant & Gould P.C.

(57) ABSTRACT

A system for full-scene anti-aliasing and stereo three-dimensional display control. The system includes a receiving buffer, a geometry offset generator, a rendering engine, and a blending engine. The receiving buffer receives a geometry, and the geometry offset generator receives stereo parameters and FSAA parameters, calculates first and second stereo offsets according to the stereo parameters, and calculates first and second FSAA offsets according to the FSAA parameters. The rendering engine combines the first and second stereo offsets with the first FSAA offset respectively to obtain first and second new offsets, combines the first and second stereo offsets with the second FSAA offset respectively to obtain third and fourth new offsets, and re-renders the geometry according to the first, second, third, and fourth new offsets respectively, so as to obtain first, second, third, and fourth new geometry. The blending engine blends the first and third new geometry to obtain a first display geometry, and blends the second and fourth new geometry to obtain a second display geometry.

10 Claims, 2 Drawing Sheets

SYSTEM AND METHOD FOR FULL-SCENE ANTI-ALIASING AND STEREO THREE-DIMENSIONAL DISPLAY CONTROL

BACKGROUND OF THE INVENTION

1. Field of the Invention

The present invention relates to a system and method for display control, and particularly to a system and method for display control in which full-scene anti-aliasing and stereo three-dimensional display can be achieved either individually or simultaneously.

2. Description of the Related Art

In an image display system, system developers always desire to repair images to obtain perfect images on display monitors. Full-scene anti-aliasing (FSAA) is a technique to remove unpleasant jaggy effect for a rendered 3D (three-dimensional) scene. Conventional techniques use super-sampling or an accumulation buffer to remove the aliasing edges.

Super-sampling requires less change to the current hardware architecture. However, it consumes a large number of memory buffers to store super-sampled pixels and then filter them to obtain in an anti-aliased scene. Accumulation buffers requires several passes to render and accumulate jittered objects. A proper blending is also required to obtain the final color for each pixel during an accumulation process.

In addition, stereo 3D display is another technique to achieve stereoscopic effect with the aid of current hardware support. Based on the parameters that define a parallax, 3D objects are rendered to left and right buffers with horizontal shift differences. The left buffer and right buffer correspond to the left-eye view and right-eye view, respectively. The left and right buffer images are displayed alternatively. An external device, such as shutter glasses, is required to guarantee the left eye sees only the left buffer image and the right eye sees only the right buffer image. As long as the switching is fast enough, the human visual system will not distinguish the alternative process, and the stereoscopic effect is perceived.

However, the hardware circuits for FSAA and stereo 3D display are independent in conventional image display system. Thus, there is a lack of a proper method in display control for both FSAA and stereo 3D and a mechanism for combining stereo offsets and jitter offsets.

SUMMARY OF THE INVENTION

It is therefore an object of the present invention to provide a system and method for display control in which full-scene anti-aliasing and stereo three-dimensional display can be achieved either individually or simultaneously.

To achieve the above objects, the present invention provides a system and method for full-scene anti-aliasing and stereo three-dimensional display control. According to one embodiment of the invention, the system for full-scene anti-aliasing and stereo three-dimensional display control includes a receiving buffer, a geometry offset generator, a rendering engine, and a blending engine.

The receiving buffer receives a geometry to be processed. The geometry offset generator receives stereo parameters corresponding to a stereo effect and FSAA parameters corresponding to a FSAA effect, calculates a first stereo offset and a second stereo offset of the geometry according to the stereo parameters, and calculates a first FSAA offset and a second FSAA offset of the geometry according to the FSAA parameters.

The rendering engine combines the first stereo offset and second stereo offset with the first FSAA offset respectively to obtain a first new offset and a second new offset, combines the first stereo offset and second stereo offset with the second FSAA offset respectively to obtain a third new offset and a fourth new offset, and re-renders the geometry according to the first new offset, second new offset, third new offset, and fourth new offset respectively, so as to obtain a first new geometry, a second new geometry, a third new geometry, and a fourth new geometry.

The blending engine blends the first new geometry and the third new geometry to obtain a first display geometry, and blends the second new geometry and the fourth new geometry to obtain a second display geometry.

According to the embodiment of the invention, the system further includes a first buffer and a second buffer to store the first display geometry and the second display geometry respectively.

According to the embodiment of the invention, the system further includes a fetch unit to fetch the first display geometry and the second display geometry from the first buffer and the second buffer, and display the first display geometry and the second display geometry sequentially.

Further, according to a second embodiment of the invention, a method for full-scene anti-aliasing and stereo three-dimensional display control is provided. First, a geometry and stereo parameters corresponding to a stereo effect and FSAA parameters corresponding to a FSAA effect are received. Then, a first stereo offset and a second stereo offset of the geometry are calculated according to the stereo parameters, and a first FSAA offset and a second FSAA offset of the geometry are calculated according to the FSAA parameters.

Then, the first stereo offset and second stereo offset are combined with the first FSAA offset respectively to obtain a first new offset and a second new offset, and the first stereo offset and second stereo offset are combined with the second FSAA offset respectively to obtain a third new offset and a fourth new offset.

Thereafter, the geometry is re-rendered according to the first new offset, second new offset, third new offset, and fourth new offset respectively, so as to obtain a first new geometry, a second new geometry, a third new geometry, and a fourth new geometry.

Finally, the first new geometry and the third new geometry are blended to obtain a first display geometry, and the second new geometry and the fourth new geometry are blended to obtain a second display geometry.

According to the embodiment of the invention, the method further stores the first display geometry and the second display geometry to a first buffer and a second buffer respectively. The method further fetches the first display geometry and the second display geometry from the first buffer and the second buffer, and displays the first display geometry and the second display geometry sequentially.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE PREFERRED EMBODIMENT

Figure 1:
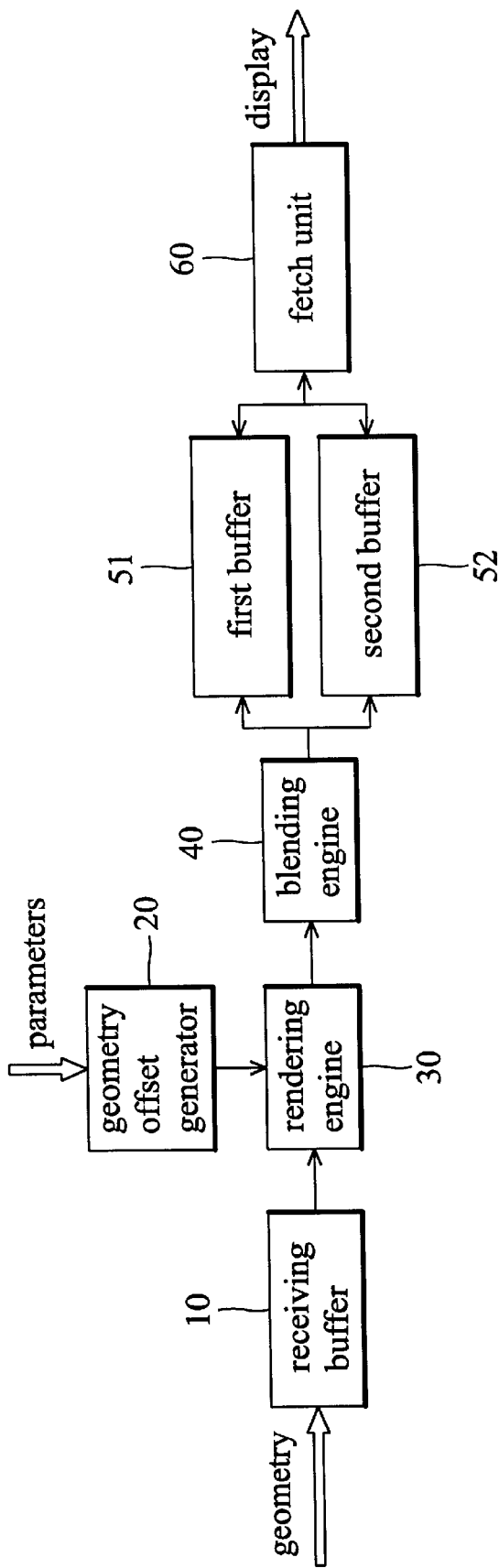
FIG. 1 is a schematic diagram showing the system structure of a system for full-scene anti-aliasing and stereo three-dimensional display control according to the embodiment of the present invention.

FIG. 1 shows the system structure of a system for full-scene anti-aliasing and stereo three-dimensional display control according to the embodiment of the present invention. Referring to FIG. 1, the system for FSAA and stereo 3D display control includes a receiving buffer 10, a geometry offset generator 20, a rendering engine 30, a blending engine 40, a first buffer 51, a second buffer 52, and a fetch unit 60.

The receiving buffer 10 receives a geometry to be processed with FSAA and stereo 3D effect. Note that, the geometry always includes a plurality of triangles in a rendering system.

The geometry offset generator 20 receives stereo parameters and FSAA parameters corresponding to a stereo effect and a FSAA effect respectively. These parameters can be used to determine the result of FSAA and stereo 3D effects. Then, the geometry offset generator 20 calculates a first stereo offset and a second stereo offset of the geometry according to the stereo parameters, and calculates a first FSAA offset and a second FSAA offset of the geometry according to the FSAA parameters. The first FSAA offset and the second FSAA offset may include a horizontal offset in the horizontal direction and a vertical offset in the vertical direction, and the first stereo offset and the second stereo offset may include a horizontal offset in the horizontal direction.

The rendering engine 30 combines the first stereo offset and second stereo offset with the first FSAA offset respectively to obtain a first new offset and a second new offset, and combines the first stereo offset and second stereo offset with the second FSAA offset respectively to obtain a third new offset and a fourth new offset.

Then, the rendering engine 30 re-renders the geometry received by the receiving buffer 10 according to the first new offset, second new offset, third new offset, and fourth new offset respectively, so as to obtain a first new geometry, a second new geometry, a third new geometry, and a fourth new geometry.

The blending engine 40 blends the first new geometry and the third new geometry generated by the rendering engine 30 to obtain a first display geometry, and blends the second new geometry and the fourth new geometry rendered by the rendering engine 30 to obtain a second display geometry. It should be noted that the method for blending geometry may be different based on different applications or image identity. For example, the blending method can be alpha blending, that is the "alpha" can be the weighted value used to blend images.

The first display geometry and the second display geometry generated by the blending engine 40 can be stored in the first buffer 51 and the second buffer 52 respectively.

The fetch unit 60 fetches the first display geometry and the second display geometry from the first buffer 51 and the second buffer 52, and displays the first display geometry and the second display geometry sequentially.

Figure 2:
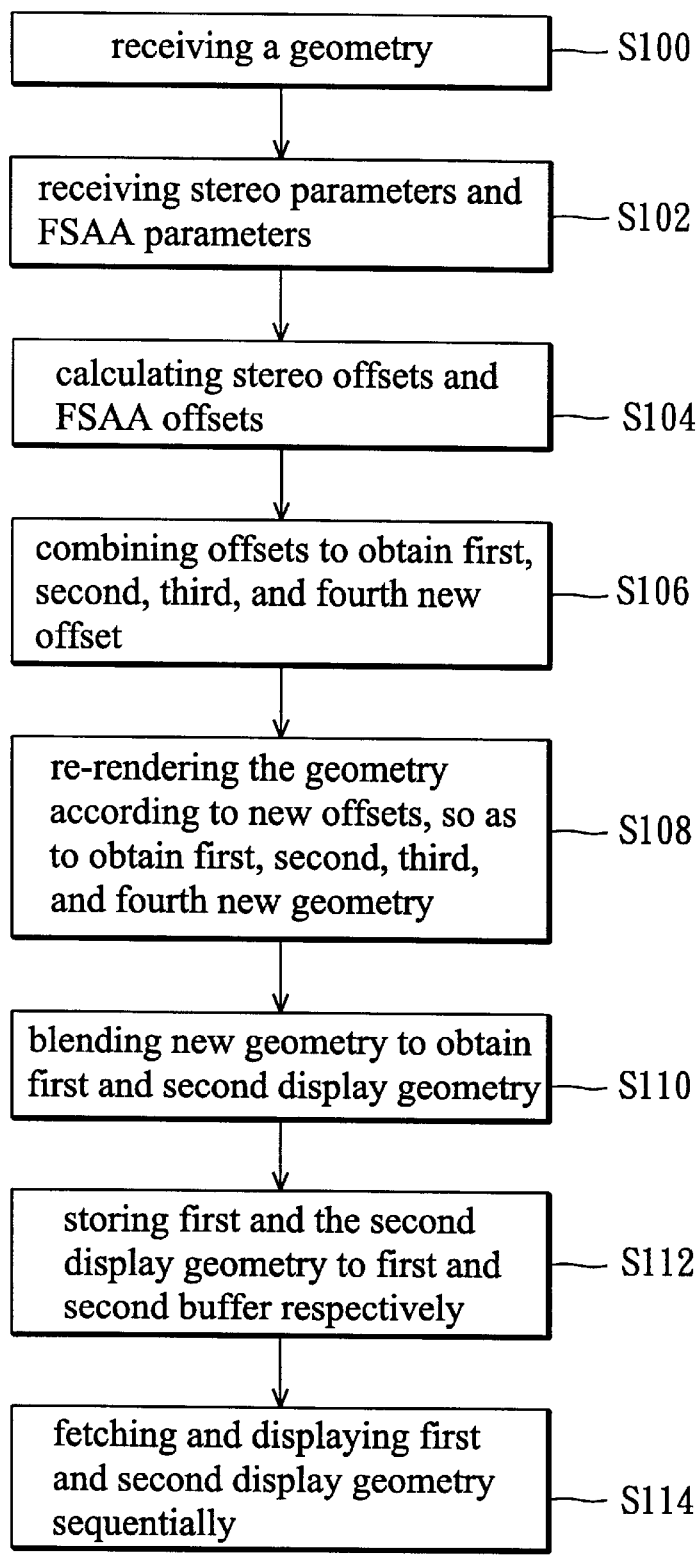
FIG. 2 is a flow chart illustrating the operation of a method for full-scene anti-aliasing and stereo three-dimensional display control according to the embodiment of the present invention.

FIG. 2 shows the operation of a method for full-scene anti-aliasing and stereo three-dimensional display control according to the embodiment of the present invention.

First, in step S100, a geometry to be processed with FSAA and stereo 3D effect is received, and in step S102, stereo parameters and FSAA parameters corresponding to stereo effect and FSAA effect respectively are received. Similarly, the geometry always includes a plurality of triangles in a rendering system, and these parameters can be used to determine the result of FSAA and stereo 3D effect Then, in step S104, a first stereo offset and a second stereo offset of the geometry are calculated according to the stereo parameters, and a first FSAA offset and a second FSAA offset of the geometry are calculated according to the FSAA parameters. Note that, the first FSAA offset and the second FSAA offset may include a horizontal offset in the horizontal direction and a vertical offset in the vertical direction, and the first stereo offset and the second stereo offset may include a horizontal offset in the horizontal direction.

Thereafter, in step S106, the first stereo offset and second stereo offset are combined with the first FSAA offset respectively to obtain a first new offset and a second new offset, and the first stereo offset and second stereo offset are combined with the second FSAA offset respectively to obtain a third new offset and a fourth new offset.

Then, in step S108, the geometry is re-rendered according to the first new offset, second new offset, third new offset, and fourth new offset respectively, so as to obtain a first new geometry, a second new geometry, a third new geometry, and a fourth new geometry.

Afterward, in step S110, the first new geometry and the third new geometry are blended to obtain a first display geometry, and the second new geometry and the fourth new geometry are blended to obtain a second display geometry. The method for blending geometry may be different based on different applications or image identity.

Then, in step S112, the first display geometry and the second display geometry are stored to first buffer and second buffer respectively. Finally, in step S114, the first display geometry and the second display geometry are fetched and displayed sequentially.

It should be noted that FSAA effect is achieved by generating two jittered geometry (first FSAA offset and second FSAA offset) in this embodiment. However, the number of jittered geometry can be increased according to different applications or quality requirements.

When the fetch unit 60 displays the first display geometry and the second display geometry on the screen sequentially, users can use an external device, such as shutter glasses, to see only the left buffer (first buffer) image with the left eye and see only the right buffer (second buffer) image with the right eye, so as to perceive FSAA and stereo 3D effects.

As a result, using the system and method for full-scene anti-aliasing and stereo three-dimensional display control according to the present invention, display full-scene anti-aliasing and stereo three-dimensional can be achieved simultaneously by combining stereo offset and jitter offset without additional hardware support.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system for full-scene anti-aliasing and stereo three-dimensional display control, comprising:

a receiving buffer to receive a geometry;

a geometry offset generator to receive stereo parameters corresponding to a stereo effect and FSAA parameters corresponding to a FSAA effect, calculate a first stereo offset and a second stereo offset of the geometry according to the stereo parameters, and calculate a first FSAA offset and a second FSAA offset of the geometry according to the FSAA parameters;

a rendering engine for combining the first stereo offset and second stereo offset with the first FSAA offset respectively to obtain a first new offset and a second new offset, combining the first stereo offset and second stereo offset with the second FSAA offset respectively to obtain a third new offset and a fourth new offset, and re-rendering the geometry according to the first new offset, second new offset, third new offset, and fourth new offset respectively, so as to obtain a first new geometry, a second new geometry, a third new geometry, and a fourth new geometry; and a blending engine for blending the first new geometry and the third new geometry to obtain a first display geometry, and blending the second new geometry and the fourth new geometry to obtain a second display geometry.

2. The system as claimed in claim 1 further comprising a first buffer and a second buffer to store the first display geometry and the second display geometry respectively.

3. The system as claimed in claim 2 further comprising a fetch unit to fetch the first display geometry and the second display geometry from the first buffer and the second buffer, and display the first display geometry and the second display geometry sequentially.

4. The system as claimed in claim 1 wherein the first FSAA offset and the second FSAA offset comprise a horizontal offset and a vertical offset.

5. The system as claimed in claim 1 wherein the first stereo offset and the second stereo offset comprise a horizontal offset.

6. An method for full-scene anti-aliasing and stereo three-dimensional display control, comprising the steps of:

receiving a geometry;

receiving stereo parameters corresponding to a stereo effect and FSAA parameters corresponding to a FSAA effect;

calculating a first stereo offset and a second stereo offset of the geometry according to the stereo parameters, and calculating a first FSAA offset and a second FSAA offset of the geometry according to the FSAA parameters;

combining the first stereo offset and second stereo offset with the first FSAA offset respectively to obtain a first new offset and a second new offset, and combining the first stereo offset and second stereo offset with the second FSAA offset respectively to obtain a third new offset and a fourth new offset;

re-rendering the geometry according to the first new offset, second new offset, third new offset, and fourth new offset respectively, so as to obtain a first new geometry, a second new geometry, a third new geometry, and a fourth new geometry; and blending the first new geometry and the third new geometry to obtain a first display geometry, and blending the second new geometry and the fourth new geometry to obtain a second display geometry.

7. The method as claimed in claim 6 further storing the first display geometry and the second display geometry to a first buffer and a second buffer respectively.

8. The method as claimed in claim 7 further fetching the first display geometry and the second display geometry from the first buffer and the second buffer, and displaying the first display geometry and the second display geometry sequentially.

9. The method as claimed in claim 6 wherein the first FSAA offset and the second FSAA offset comprise a horizontal offset and a vertical offset.

10. The method as claimed in claim 6 wherein the first stereo offset and the second stereo offset comprise a horizontal offset.

* * * * *